(12) United States Patent
Reeves

(10) Patent No.: US 12,517,727 B2
(45) Date of Patent: Jan. 6, 2026

(54) MATRIX-FUSED MIN-ADD INSTRUCTIONS

(71) Applicant: Advanced Micro Devices, Inc., Santa Clara, CA (US)

(72) Inventor: Steven Isaac Reeves, Truckee, CA (US)

(73) Assignee: Advanced Micro Devices, Inc., Santa Clara, CA (US)

(*) Notice: Subject to any disclaimer, the term of this patent is extended or adjusted under 35 U.S.C. 154(b) by 32 days.

(21) Appl. No.: 18/542,763

(22) Filed: Dec. 17, 2023

(65) Prior Publication Data
US 2025/0199806 A1    Jun. 19, 2025

(51) Int. Cl.
  *G06F 9/30*    (2018.01)
  *G06F 9/345*    (2018.01)
(52) U.S. Cl.
  CPC ............ *G06F 9/3001* (2013.01); *G06F 9/345* (2013.01)
(58) Field of Classification Search
  CPC .... G06F 9/3001; G06F 9/345; G06F 9/30021; G06F 9/30036
  See application file for complete search history.

(56) References Cited

U.S. PATENT DOCUMENTS

| | | | | |
|---|---|---|---|---|
| 11,636,063 B2* | 4/2023 | Hung | ................ | G06N 3/063 712/7 |
| 2004/0054873 A1* | 3/2004 | Morris | ............. | G06F 9/30032 712/E9.034 |
| 2004/0098662 A1* | 5/2004 | Cameron | .......... | H04L 1/0055 714/796 |
| 2015/0058603 A1* | 2/2015 | Anderson | .......... | G06F 9/30047 712/226 |
| 2016/0202975 A1* | 7/2016 | Gopal | ............. | G06F 9/30036 712/208 |
| 2017/0192782 A1* | 7/2017 | Valentine | ......... | G06F 9/30112 |
| 2023/0081763 A1* | 3/2023 | Boemer | ............ | G06F 9/30036 712/208 |
| 2023/0305844 A1* | 9/2023 | Tyrlik | ............... | G06F 9/30038 |

OTHER PUBLICATIONS

Kannan, Ramakrishnan, et al., "Scalable Knowledge Graph Analytics at 136 Petaflop/s", SC20: International Conference for High Performance Computing, Networking, Storage and Analysis [retrieved Apr. 12, 2023]. Retrieved From the Internet <https://www.cse.wustl.edu/~roger/566S.s21/3433701.3433708.pdf>., Nov. 2020, 13 Pages.

* cited by examiner

*Primary Examiner* — Farley Abad
(74) *Attorney, Agent, or Firm* — FIG. 1 Patents

(57) ABSTRACT

Matrix-fused min-add (MFMA) instructions are described. The MFMA instructions cause a processing device to execute at least one of a min-plus function or a plus-min function. The MFMA instructions cause the processor device to execute min-plus and plus-min functions in response to a single instruction and without performing a multiplication operation as required by conventional systems. In accordance with the described techniques, a MFMA instruction causes multiple logic units (e.g., threads or wavefronts) of a processing device to execute a min-plus function, a plus-min function, or combinations thereof, as part of completing a computational task. To optimize system efficiency, the MFMA instruction causes the processing device to execute the min-plus function, the plus-min function, or combinations thereof using data stored in local registers of the processor device.

20 Claims, 4 Drawing Sheets

MATRIX-FUSED MIN-ADD INSTRUCTIONS

BACKGROUND

Generalized matrix functions represent critical operations executed as part of performing a range of different computational tasks, including tensor calculus, quantum mechanics, machine learning, linear algebra, and so forth. Generalized matrix functions enable performance of matrix operations on data with more complex structures than simple arrays of numbers (e.g., tensor data structures representing images, videos, natural language sequences of words, graphs, and so forth), which thus represents a powerful tool for modeling and analyzing high-dimensional data. Operations involved in many generalized matrix functions include comparing two numbers to identify which of the two numbers is greater, then adding a different number to the greater of the two numbers, which requires multiple steps to perform when executed by a processing device. Common generalized matrix function applications include performing numerous (e.g., millions) of these comparison and addition functions.

DETAILED DESCRIPTION

Figure 1:
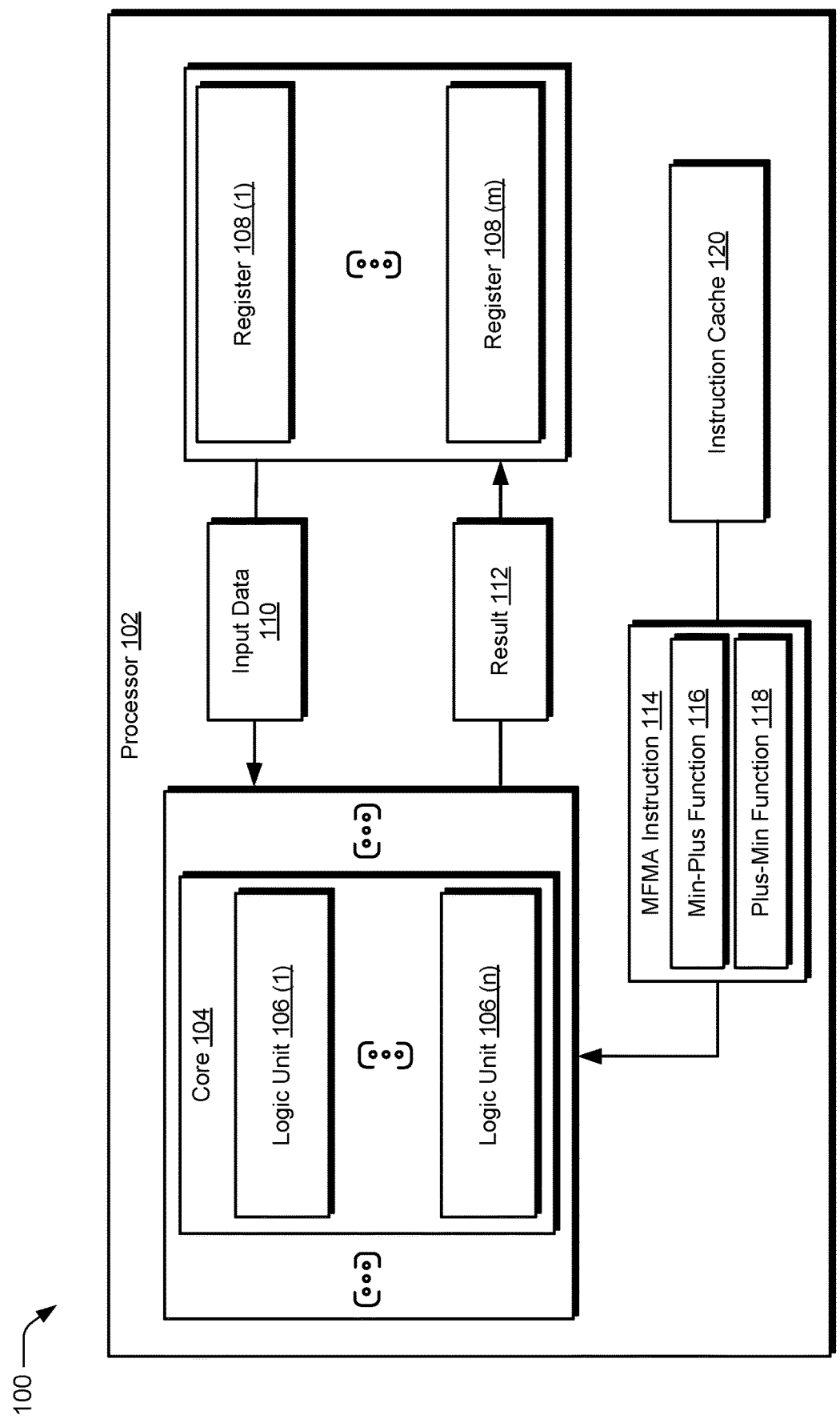
FIG. 1 is a block diagram of an example system having a processor with at least one core that includes multiple logic units, where each of the multiple logic units are configured to generate a result in response to receiving an instruction to execute one or more of a min-plus function or a plus-min function using data stored in at least one register of the processor.

Matrix operations, such as generalized matrix functions, are commonly used to perform a range of different computational tasks. For instance, matrix operations are particularly useful in the context of graphics processing unit (GPU) computations and represent a fundamental operation used in a vast majority of GPU computing applications. As an example, conventional matrix multiplication involves two input matrices A and B of dimensions m×n and n×p, respectively. Under conventional matrix multiplication, the two input matrices A and B are multiplied together to produce an output matrix C of dimensions m×p, where each element of C is the dot product of a row of A and a column of B.

In generalized matrix functions, two matrices A and B can have different dimensions and shapes (e.g., input matrices are permitted to have additional dimensions beyond merely rows and columns). For instance, in the context of performing a tensor operation, input matrices are defined by multiple dimensions (e.g., height, width, and depth) and the output matrix is similarly permitted to have additional dimensions (e.g., beyond row and column dimensions).

Due to having a high degree of parallelism and being designed to efficiently perform matrix operations, GPUs and similar accelerators are commonly implemented to perform matrix operations in place of a central processing unit (CPU). Given inherent GPU architectures, which commonly include multiple processing cores that each include multiple logic units, GPUs are configured to divide matrix operations into smaller sub-matrices and task each of the multiple logic units with performing matrix multiplication in parallel, simultaneously with one another. Systems that perform matrix operations using accelerators such as GPUs benefit from increased computational efficiency relative to a system architecture that tasks a CPU with performing the same matrix operations.

Conventional approaches to executing matrix functions involve a two-step operation that includes performing addition and multiplication. When executing certain computational tasks, the involved matrix operations require performing numerous (e.g., millions) instances of this two-step operation. Consequently, even though implementing a GPU to perform matrix operations instead of a CPU provides computational efficiency, conventional approaches to executing matrix operations require significant amounts of computational resources and time to do so (e.g., unnecessarily consuming processing resources and associated power).

To address these conventional problems, matrix-fused min-add (MFMA) instructions are described. The MFMA instructions described herein involve executing at least one of a min-plus function or a plus-min function on data stored in a matrix format, which replaces the multiplication portion of the conventional two-step operation involving addition and multiplication with a minimum operation.

As an example, performing a min-plus function as part of executing a MFMA instruction, using two real numbers "a" and "b," involves performing $a \oplus b = \min(a, b)$ and $a \otimes b = a + b$. In the min-plus function of an MFMA instruction, $\oplus$ represents the minimum operation that replaces the addition step used in conventional matrix operations and $\otimes$ represents an addition operation that replaces the multiplication step used in conventional matrix operations. Thus, continuing this min-plus function example, if a=3 and b=5, then $a \oplus b = \min(3,5) = 3$ and $a \otimes b = 3 + 5 = 8$.

As another example, performing a plus-min function as part of executing a MFMA instruction, using two real numbers "a" and "b," involves performing $a \oplus b = a + b$ and $a \otimes b = \min(a, b)$ and $a \otimes b = \min(a, b)$. In the plus-min function of an MFMA instruction, $\oplus$ represents the addition operation that replaces the addition step used in conventional matrix operations and $\otimes$ represents the minimum operation that replaces the multiplication step used in conventional matrix operations. Thus, continuing this plus-min function example, if a=3 and b=5, then $a \oplus b = 3 + 5 = 8$ and $a \otimes b = \min(3,5) = 3$.

By utilizing addition and minimum operations instead of the conventional combination of addition and multiplication operations, the MFMA instructions described herein enable a processing device (e.g., a GPU) to perform a matrix operation using significantly fewer computations, and therefore significantly fewer system clock cycles, by distributing computation of MFMA instructions among different logic units of the processing device for simultaneous performance. For instance, the MFMA instructions described herein enable performing matrix operations using less than half the system clock cycles relative to conventional systems that do not distribute computations among different logic units and thus require sequential performance of matrix operations, which increases computational latency.

The MFMA instructions described herein are particularly useful in a range of different computing tasks performed by a GPU or other accelerator. For instance, the MFMA instructions are used to execute min-plus and plus-min functions as part of performing shortest path algorithms (e.g., shortest path problems where the goal is to identify a shortest path between two nodes of a weighted graph), dynamic programming (e.g., edit distance calculation, sequence alignment, etc.), scheduling (e.g., optimizing resource allocation over time), control theory (e.g., modeling and analyzing behavior of manufacturing systems, communication networks, transportation systems, etc.), and so forth.

In accordance with the techniques described herein, the MFMA instructions are carried out by at least one core of a processor device, such as a GPU that includes a plurality of cores, which each include multiple logic units (e.g., threads, wavefronts, etc.) that are caused to execute a min-plus function, a plus-min function, or combinations thereof, when performing a computational task. In implementations, the MFMA instructions cause the processor device to simultaneously execute min-plus functions, plus-min functions, or combinations thereof, using multiple logic units that process data stored in local registers of the processor device.

For instance, in an example scenario where a MFMA instruction causes a processing device to execute a plus-min function, multiple logic units of the processing device are each caused to generate a result by first selecting a plurality of pairs of values, where each pair of values includes one value maintained at a first register of the processing device and one value maintained at a second register of the processing device. The logic units are then each tasked with identifying a plurality of minimum values from the plurality of pairs of values. Using the plurality of minimum values, each logic unit generates a summed value by summing the plurality of minimum values and writing the summed value to a fourth register of the processing device. Finally, the result is generated by updating the summed value using another value stored at a third register of the processing device (e.g., adding the value stored at the third register to the summed value maintained at the fourth register). In this manner, in implementations where the fourth register includes data represented in a matrix format, each of the plurality of logic units are tasked with computing one or more entries of data represented in the matrix format.

Advantageously, the MFMA instruction causes each logic unit of the processing device to execute the plus-min function by reading and/or writing data from the first, second, third, and fourth registers in response to a single instruction, in contrast to conventional approaches. For instance, the MFMA instruction includes information describing one or more locations in each of the first, second, third, and fourth registers from which data is to be read and/or written by a given logic unit. Furthermore, the MFMA instruction causes each logic unit to execute the plus-min function independent of (e.g., without) performing the multiplication operations required by some conventional plus-min function instructions.

In another example scenario where a MFMA instruction causes a processing device to execute a min-plus function, multiple logic units of the processing device are each caused to generate a result by computing a summed value that results from adding a first value stored at a first register to a second value stored at a second register, then storing the summed value at a fourth register. The MFMA instructions further causes each logic unit to compare the summed value with a value stored at a third register. Each logic unit finally outputs a result by either maintaining the summed value at the fourth register or replacing the summed value with the value stored at the third register, by selecting a minimum value (e.g., a minimum value between the value stored at the third register or the summed value previously written to the fourth register). In this manner, in implementations where the fourth register includes data represented in a matrix format, each of the plurality of logic units are tasked with computing one or more entries of data represented in the matrix format.

Advantageously, the MFMA instruction causes each logic unit of the processing device to execute the min-plus function by reading and/or writing data from the first, second, third, and fourth registers in response to a single instruction (e.g., by including information describing one or more locations in each of the first, second, third, and fourth registers from which data is to be read and/or written by each logic unit in the MFMA instruction), in contrast to conventional approaches. Furthermore, the MFMA instruction causes each processing device logic unit to execute the min-plus function independent of performing the multiplication operations required by some conventional min-plus function instructions.

In contrast to conventional computing architectures, the systems and techniques described herein cause processing devices to execute plus-min functions and min-plus functions using substantially fewer instructions (e.g., using a single MFMA instruction instead of separate vector instructions for each addition and minimum operation performed), which enables for efficient distribution of a processing load among different logic units of each processing device core. In this manner, the MFMA instruction increases parallelism by simultaneously occupying different logic units (e.g., threads, wavefronts, etc.) during performance of a computational task by a processing device.

Furthermore, by offloading execution of plus-min and min-plus functions to a processing device that is different from a system host processor (e.g., a CPU), the described techniques further advantageously save cycles of the host processor, which reduces system power consumption and frees the host processor to perform additional operations relative to conventional systems.

In some aspects, the techniques described herein relate to a method including: generating a result in response to an instruction to execute at least one of a min-plus function or a plus-min function using data stored at a first storage location, data stored at a second storage location, and data stored at a third storage location; and output the result to a fourth storage location.

In some aspects, the techniques described herein relate to a method, wherein the instruction is to execute the min-plus function, and wherein the method further includes executing the instruction by: computing a summed value by summing a pair of values, the pair of values including a first value stored at the first storage location and a second value stored at the second storage location; writing the summed value to a fourth storage location; and generating the result by comparing the summed value with a value stored at the third storage location; and outputting the result by: maintaining the summed value at the fourth storage location responsive to the summed value representing a minimum value when compared to the value stored at the third storage location; or overwriting the summed value at the fourth storage location with the value stored at the third storage location responsive to the value stored at the third storage location representing the minimum value when compared to the summed value.

In some aspects, the techniques described herein relate to a method, wherein receiving the instruction, executing the instruction, and outputting the result is performed by a logic unit of a core of a processor.

In some aspects, the techniques described herein relate to a method, wherein the first storage location, the second storage location, the third storage location, and the fourth storage location each represent a location in one or more registers of the processor.

In some aspects, the techniques described herein relate to a method, wherein the first storage location, the second storage location, the third storage location, and the fourth storage location each correspond to a different register of the processor.

In some aspects, the techniques described herein relate to a method, wherein the logic unit includes a plurality of threads, wherein executing the instruction and outputting the result is performed by each of the plurality of threads simultaneously.

In some aspects, the techniques described herein relate to a method, wherein the first storage location, the second storage location, the third storage location, and the fourth storage location are different for each of the plurality of threads.

In some aspects, the techniques described herein relate to a method, wherein the fourth storage location is defined by the instruction.

In some aspects, the techniques described herein relate to a method, wherein the first value and the second value are each associated with an index value that describes where the first value is located at the first storage location and where the second value is located at the second storage location.

In some aspects, the techniques described herein relate to a method, wherein computing the summed value includes computing a plurality of summed values using respective pairs of values from the first storage location and the second storage location.

In some aspects, the techniques described herein relate to a method, wherein writing the summed value to the fourth storage location includes selecting the summed value from the plurality of summed values, wherein the summed value represents a minimum value of the plurality of summed values.

In some aspects, the techniques described herein relate to a method, wherein the instruction is to execute the plus-min function, and wherein the method further includes: executing the instruction by: selecting a plurality of pairs of values, each pair of values in the plurality of pairs of values including a value maintained at the first storage location and a value maintained at the second storage location; identifying a plurality of minimum values based on the plurality of pairs of values; generating a summed value by summing the plurality of minimum values and writing the summed value to a fourth storage location; and generating a final value by adding the summed value to a value stored at the third storage location; and outputting the final value as the result.

In some aspects, the techniques described herein relate to a method, wherein outputting the final value as the result includes overwriting the summed value at the fourth storage location with the final value.

In some aspects, the techniques described herein relate to a method, wherein address information for each value in the plurality of pairs of values is defined by the instruction.

In some aspects, the techniques described herein relate to a method, wherein receiving the instruction, executing the instruction, and outputting the final value as the result is performed by a logic unit of a core of a processor.

In some aspects, the techniques described herein relate to a method, wherein the first storage location, the second storage location, the third storage location, and the fourth storage location each represent a location in one or more registers of the processor.

In some aspects, the techniques described herein relate to a method, wherein the logic unit includes a plurality of threads, wherein executing the instruction and outputting the final value as the result is performed by each of the plurality of threads simultaneously.

In some aspects, the techniques described herein relate to a method, wherein the first storage location, the second storage location, the third storage location, and the fourth storage location are different for each of the plurality of threads.

In some aspects, the techniques described herein relate to a processing device including: a plurality of registers; and at least one core that includes a plurality of logic units, each of the plurality of logic units configured to: generate a result in response to an instruction to execute at least one of a min-plus function or a plus-min function using data stored at a first register of the plurality of registers, data stored at a second register of the plurality of registers, and data stored at a third register of the plurality of registers; and output the result to a fourth register of the plurality of registers.

In some aspects, the techniques described herein relate to a system including: a processor to: generate a result in response to an instruction to execute at least one of a min-plus function or a plus-min function using data stored at a first storage location, data stored at a second storage location, and data stored at a third storage location; and output the result to a fourth storage location.

FIG. 1 is a block diagram of a system 100 that includes a processor with at least one core, where each core includes a plurality of logic units. The processor further includes a plurality of registers that are configured to locally store data at the processor. The processor also includes an instruction cache that maintains one or more instructions which, when executed by the plurality of logic units, cause the plurality of logic units to each execute at least one of a min-plus function or a plus-min function using data stored in the registers of the processor.

For instance, the system 100 includes processor 102, which includes at least one core 104. In one or more implementations, the processor 102 includes multiple cores 104, as represented by the ellipses surrounding core 104 in the illustrated example of FIG. 1. Each core 104 includes a plurality of logic units 106, depicted in the illustrated example of FIG. 1 by logic unit 106(1) and logic unit 106(n), where n represents any integer. By including one or more cores 104 that each include a plurality of logic units 106, the processor 102 enables parallel processing of data and thus efficient execution of functions and operations involved in performing computational tasks.

Examples of devices in which the system 100 is implemented include, but are not limited to, supercomputers and/or computer clusters of high-performance computing (HPC) environments, servers, personal computers, laptops, desktops, game consoles, set top boxes, tablets, smartphones, mobile devices, virtual and/or augmented reality devices, wearables, medical devices, systems on chips, and other computing devices or systems. In this manner, the processor 102 is an electronic circuit implemented as a GPU, a field programmable gate array (FPGA), an accelerated processing unit (APU), a digital signal processor (DSP), a processing-in-memory component (PIM component), and so forth.

Each logic unit 106 is representative of a compute unit (e.g., a streaming multiprocessor) that is responsible for executing instructions and performing computations on the processor 102. For instance, in some implementations each logic unit 106 represents an arithmetic logic unit or a shader unit, which are configured to perform operations such as arithmetic calculations, logical operations, data transformations, and other functions required for completion of computational tasks.

In some implementations, the plurality of logic units 106 perform operations and functions using data stored in registers 108 of the processor 102. For instance, in the illustrated example of FIG. 1, the processor 102 is depicted as including register 108(1) and register 108(m), where m represents any integer. As described herein, a register refers to small, fast memory units located on the processor 102 itself (e.g., a memory unit located on a GPU chip itself). Each register 108 is configured to store data for processing by the core 104 (e.g., the plurality of logic units 106 included in a core 104), such as numerical values, variables, intermediate results, instructions pertaining to a computational task, and so forth. In implementations, the registers 108 permit the processor 102 to access data faster than accessing data from a storage location not on the processor 102 (e.g., faster than accessing data from main memory of the system 100).

For instance, in implementations the registers 108 are configured to store data retrieved by the processor 102 from one or more memory modules (not depicted in the illustrated example of FIG. 1) via a connection or interface between the processor 102 and the one or more memory modules. For instance, the processor 102 is connected to one or more memory modules via one or more wired or wireless connections, or combinations thereof, such as buses (e.g., a data bus), interconnects, traces, planes, and so forth. In implementations, a memory module from which data stored in the registers 108 is obtained is a circuit board (e.g., a printed circuit board), on which a corresponding portion of memory of the system 100 is mounted.

The techniques described herein are applicable to different system architectures where data is obtained from different segments of memory and written to one or more of the registers 108 to enable performance of a computational task by the processor 102, without limitation as to the different system architecture configurations. In this manner, the techniques described herein are extendable to various system memory architectures such as memory interleaving architectures, memory channel segmentation architectures, memory module segmentation architectures, memory region segmentation architectures, combinations thereof, and so forth. Examples of system 100 memory modules from which data is retrieved and stored in the registers 108 include, but are not limited to, TransFlash memory modules, single in-line memory modules (SIMM), dual in-line memory modules (DIMM), and combinations thereof.

Memory of the system 100 that persists data which is temporarily retrieved for storage in the registers 108 includes high bandwidth memory (HBM) in a 3D-stacked implementation. Alternatively or additionally, memory of the system 100 corresponds to or includes non-volatile memory, examples of which include solid state disks (SSD), flash memory, read-only memory (ROM), programmable read-only memory (PROM), erasable programmable read-only memory (EPROM), and electronically erasable programmable read-only memory (EEPROM).

In terms of data communication pathways, memory of the system 100 (e.g., from which data was obtained and stored in one or more of the registers 108) is further away from the processor 102 than the registers 108, both physically and topologically. Consequently, by storing data in the registers 108 for use in performing a computational task, rather than requiring the processor 102 to obtain the same data from memory during performance of the computational task, the processor 102 reduces data transfer latency, increases data communication bandwidth, and decreases data communication energy consumption, which thus improves performance of the system 100.

Generally, when performing a computational task, the processor 102 tasks the logic units 106 of one or more cores 104 with processing input data 110 (e.g., data retrieved from one or more of the registers 108) to generate a result 112. A manner in which the input data 110 is retrieved from the registers 108, the input data 110 is processed by various ones of the plurality of logic units 106, and the result 112 is output depends on a computational task being performed by the processor 102. For instance, a computational task includes one or more instructions that identify addresses for one or more data storage locations (e.g., addresses in the registers 108) that store the input data 110, identify operations or functions to be performed using the input data 110, and identify a type of the result 112 to be generated, as well as an output destination for the result 112.

For instance, in some implementations performing a computational task causes the core 104 to communicate the result 112 to a requesting source for which the processor 102 is performing the computational task. As a specific example, in an implementation where the processor 102 is a GPU performing a computational task at the request of a CPU, the processor 102 is configured to output the result 112 to the CPU. Alternatively or additionally, in some implementations computational task instructions cause the processor 102 to output the result 112 to a storage location in memory of the system 100 (not depicted in the illustrated example of FIG. 1), such as for subsequent access and/or retrieval by a different processing device. Alternatively or additionally, in some implementations computational task instructions cause the processor 102 to store the result 112 locally (e.g., in one or more of the registers 108), such as depicted in the illustrated example of FIG. 1.

In accordance with the techniques described herein, one or more cores 104 of the processor 102 are caused to process input data 110 and generate a result 112 according to an MFMA instruction 114. The MFMA instruction 114 causes the one or more cores 104 to execute at least one of a min-plus function 116 or a plus-min function 118. In implementations, the MFMA instruction 114 further includes information describing storage location addresses from which the input data 110 is to be retrieved (e.g., storage location addresses in the registers 108) and processed using at least one of the min-plus function 116 or the plus-min function 11, as well as storage location information for outputting the result 112 (e.g., a destination address in the registers 108). Examples of the core 104 executing the min-plus function 116 and the plus-min function 118 are described in further detail below with respect to FIGS. 2-4.

In some implementations, the MFMA instruction 114 is received by the processor 102 from a source that requests or commands the processor 102 to perform a computational task. For instance, in an example scenario where the processor 102 is a GPU that performs at least a portion of a computational task on behalf of a CPU, the MFMA instruction 114 is received by the processor 102 from a CPU. Alternatively or additionally, in some implementations the MFMA instruction 114 is obtained locally from an instruction cache 120 of the processor 102.

The instruction cache 120 represents local storage of the processor 102 to maintain a list of one or more instructions that the processor 102 needs to execute during performance of a computational task. By storing the MFMA instruction 114 in the instruction cache 120, the processor 102 is configured to retrieve and execute the MFMA instruction 114 more efficiently (e.g., faster) relative to retrieving the MFMA instruction 114 from main memory of the system 100. Thus, in some implementations the processor 102 pre-populates the instruction cache 120 with one or more MFMA instructions 114 prior to beginning, or upon beginning, performance of a computational task that involves executing a MFMA instruction 114 to generate a result 112.

Figure 2:
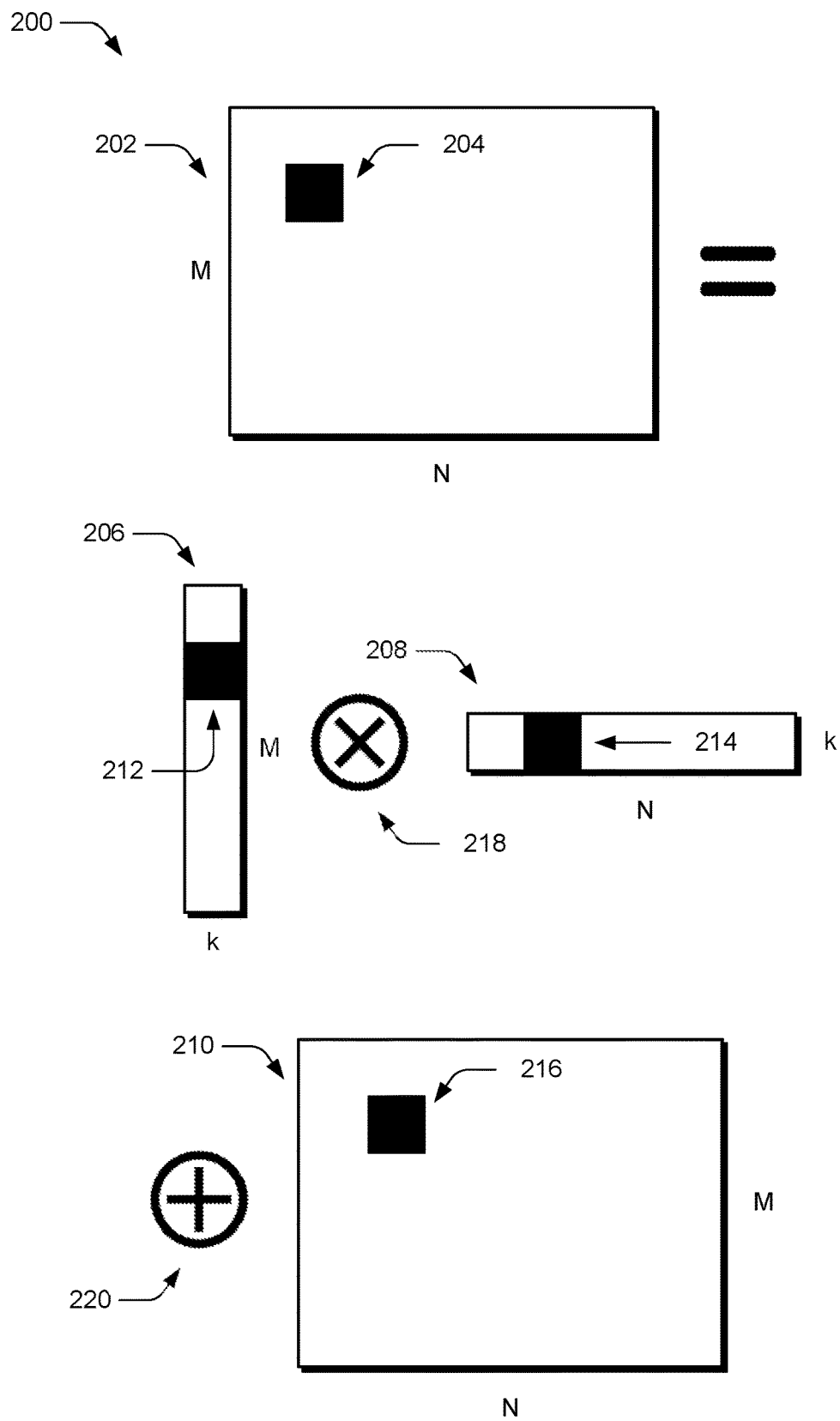
FIG. 2 depicts an example of a processor generating a result by executing one or more of a min-plus function or a plus-min function using data stored in a matrix format in at least one register of the processor.

FIG. 2 depicts an example 200 of the processor 102 generating a result 112 by processing input data 110 according to a min-plus function 116 or a plus-min function 118 included in a MFMA instruction 114.

In the illustrated example 200, matrix 202 represents a destination register of the registers 108 to which the result 112 is output, where entry 204 in the matrix 202 represents an instance of the result 112 (e.g., generated by executing a min-plus function 116 or a plus-min function 118 included in the MFMA instruction 114). Matrix 202 is defined by dimensions M×N, where M and N each represent any suitable integer (e.g., in some implementations, M=N=4, 16, or 32).

Specifically, when executing a min-plus function 116 or a plus-min function 118 to generate entry 204, a logic unit 106 is caused to retrieve (e.g., as input data 110), matrix 206, matrix 208, and matrix 210 from the registers 108. In some implementations, each matrix (e.g., matrix 202, matrix 206, matrix 208, and matrix 210) are stored in separated registers 108 of the processor 102. Alternatively or additionally, in some implementations a single one of the registers 108 includes at least a portion of different ones of the matrices (e.g., at least a portion of two or more of the matrix 202, matrix 206, matrix 208, or matrix 210). For instance, in implementations portion 212 is maintained at a first storage location, portion 214 is maintained at a second storage location, portion 216 is maintained at a third storage location, and entry 204 is output as a result 112 to a fourth storage location, where each storage location corresponds to one or more addresses in the registers 108.

Matrix 206 is defined by dimensions M×k, where k represents any suitable integer (e.g., in some implementations k=1, 2, 4, 8, 16, or 32). Matrix 208 is defined by dimensions k×N, and matrix 210 is defined by dimensions M×N. In implementations, the MFMA instruction 114 identifies respective portions of the matrix 206, the matrix 208, and the matrix 210 that are to be used in generating the entry 204. For instance, the MFMA instruction 114 identifies that generating entry 204 as the result 112 involves processing portion 212 from matrix 206, portion 214 from matrix 208, and portion 216 from matrix 210. In implementations, each portion (e.g., processing portion 212, portion 214, and portion 216) represent at least one numerical value stored in the respective matrix that includes the portion.

For instance, in an example scenario portion 216 includes represents one numerical value maintained in the matrix 210. Continuing this example scenario, portion 212 and portion 214 each include k numerical values that are processed as part of executing the MFMA instruction 114. In implementations, the MFMA instruction 114 thus causes a logical unit 106 to retrieve only the processing portion 212, the portion 214, and the portion 216 as input data 110 for executing a min-plus function 116 or a plus-min function 118 (e.g., instead of retrieving an entirety of the matrix 206, the matrix 208, and/or the matrix 210).

The MFMA instruction 114 further includes operand 218 and operand 220, which define how the logic units 106 process the input data 110 to generate the result 112. Operand 218, denoted ⊕, represents an addition operation in the context of a min-plus function 116. In the context of a plus-min function 118, operand 218 represents an addition operation. Operand 220, denoted ⊕, represents a minimum operation in the context of a min-plus function 116. In the context of a plus-min function 118, operand 220 represents an addition operation.

Thus, the min-plus function 116 and the plus-min function 118 included in an MFMA instruction 114 are each expressible according to Equation 1 below, where entry 204 is represented as D, processing portion 212 is represented as A, portion 214 is represented as B, and portion 216 is represented as C:

$$D = A \otimes B \oplus C \qquad \text{(Eq. 1)}$$

For instance, consider an example scenario where k=4 (e.g., such that portion 212 represents four values—$A_0$, $A_1$, $A_2$, and $A_3$—and portion 214 represents four values—$B_0$, $B_1$, $B_2$, and $B_3$). In this example scenario, a min-plus function 116 causes a logic unit 106 to execute Equation 1 according to Equation 2:

$$D = \min((A_0 + B_0), (A_1 + B_1), (A_2 + B_2), (A_3 + B_3)) \oplus C \qquad \text{(Eq. 2)}$$

Equation 2 thus represents how the min-plus function 116 causes the logic unit 106 to compute a summed value for each pair of values from portion 212 and portion 214, where each pair of values shares a common index value k.

In the case of computing multiple summed values (e.g., when k>1), the min-plus function 116 causes the logic unit 106 to select a minimum summed value (e.g., a minimum value from $(A_0+B_0)$, $(A_1+B_1)$, $(A_2+B_2)$, and $(A_3+B_3)$). The minimum summed value is written to the entry 204 in matrix 202 as an intermediary result used in executing the min-plus function 116. Completing the min-plus function 116 is performed by comparing the minimum summed value to the value represented by portion 216 in matrix 210.

The logic unit 106 executing the min-plus function 116 is tasked with comparing the minimum summed value written to entry 204 as an intermediary result with the value represented by portion 216 and identify the smaller of these two values (e.g., identify the minimum value), which is written to entry 204 in matrix 202. For instance, if the summed value written to entry 204 as the intermediary result is smaller than the value of portion 216, then the entry 204 is maintained as the result 112. Alternatively, if the value of portion 216 is smaller than the summed value written to entry 204, the value of portion 216 is used to overwrite data previously stored in entry 204 as part of outputting the result 112.

Alternatively, continuing the above example scenario where k=4, a plus-min function 118 causes a logic unit 106 to execute Equation 1 according to Equation 3:

$$D = \min(A_0, B_0) + \min(A_1, B_1) + \min(A_2, B_2) + \min(A_3, B_3) + C \qquad \text{(Eq. 3)}$$

Equation 3 thus represents how the plus-min function 118 causes the logic unit 106 to compute identify a minimum value from each pair of values in portion 212 and portion 214, where each pair of values shares a common index value k. Minimum values from each value pair are then summed and written to entry 204 as a summed value. Finally, the summed value written to entry 204 is updated by adding the value represented at portion 216 to achieve the result 112 for the plus-min function 118.

Although illustrated and described in the context of generating a single result 112, via the parallelism afforded by the plurality of logic units 106 in a core 104 and the plurality of cores 104 in a processor 102, the techniques described herein cause multiple logic units 106 to each generate a separate result 112, simultaneously, by retrieving and processing different input data 110, as defined by the MFMA instruction 114. Advantageously, the techniques described herein enable the processor 102 to perform a computational task that involves execution of numerous min-plus functions 116 and/or plus-min functions 118 using fewer instructions and system clock cycles relative to conventional approaches.

Figure 3:
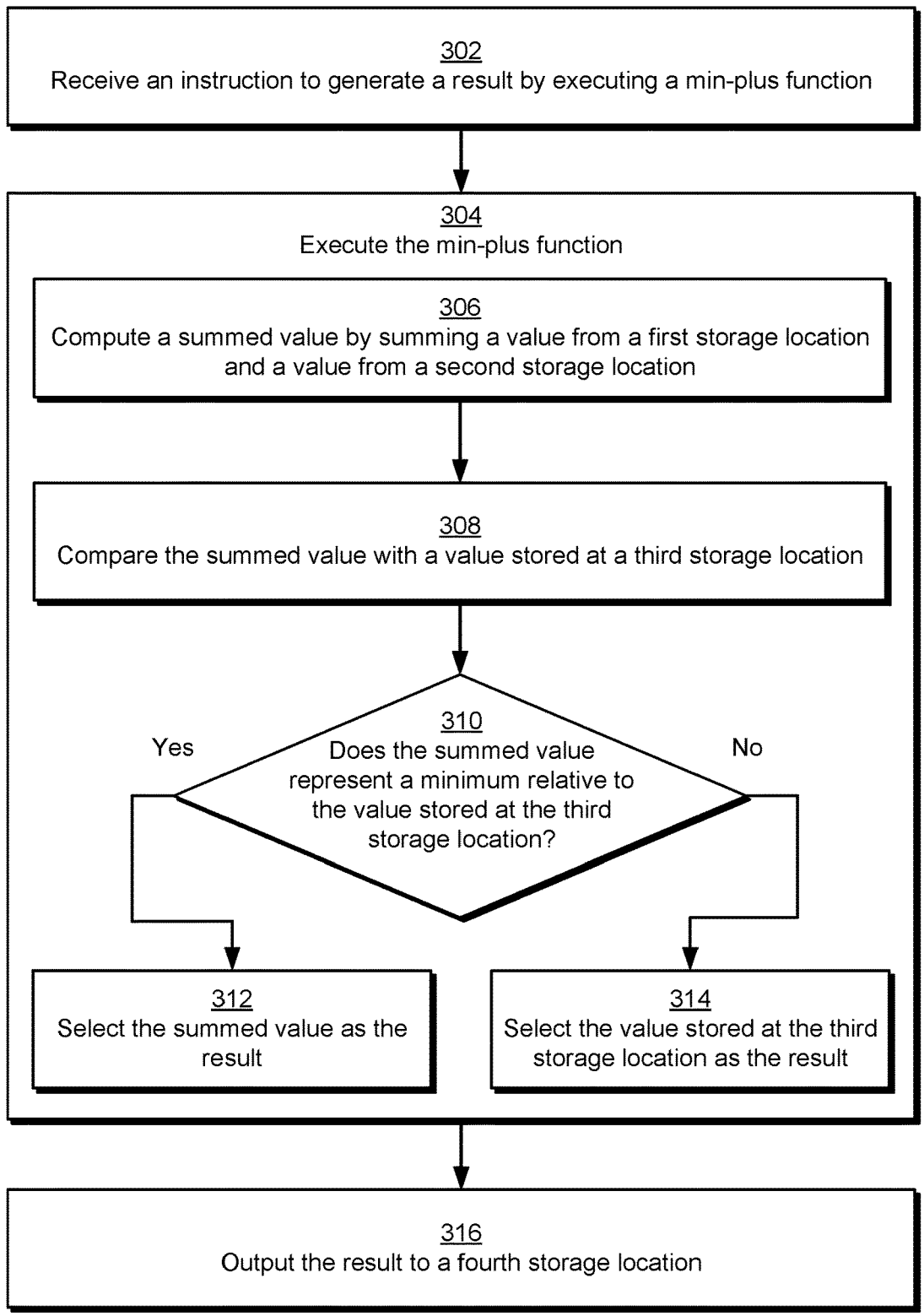
FIG. 3 depicts a procedure in an example implementation of a processor generating a result by executing a matrix min-plus function.

FIG. 3 depicts a procedure 300 in an example implementation of generating a result by executing a min-plus function in accordance with the techniques described herein.

To begin, an instruction to generate a result by executing a min-plus function is received (block 302). The core 104, for instance, receives a MFMA instruction 114 that causes one or more logic units 106 of the core 104 to execute a min-plus function 116 as part of performing a computational task.

The min-plus function is executed in response to receiving the instruction (block 304). As part of executing the min-plus function, a summed value is computed by summing a value from a first storage location and a value from a second storage location (block 306). A logic unit 106 of the core 104, for instance, adds a value included in portion 212 with a value included in portion 214. In implementations, address information for the portion 212 and the portion 214 is included in the MFMA instruction 114 and corresponds to one or more registers 108 of the processor 102. In implementations where the portion 212 and the portion 214 each include multiple values, the logic unit 106 computes a plurality of summed values, one for each value pair from portion 212 and portion 214, and selects a minimum summed value as the summed value. The summed value is written to the entry 204 as an intermediate result.

As further part of executing the min-plus function, the summed value is compared with a value stored at a third storage location (block 308). The logic unit 106, for instance, compares the summed value written as the intermediary result to entry 204 with a value maintained at portion 216 of matrix 210.

A determination is then made as to whether the summed value represents a minimum value relative to the value stored at the third storage location (block 310). In response to identifying that the summed value written as the intermediary result to entry 204 is smaller than (e.g., less than) the value at portion 216 (e.g., a "Yes" decision at block 310), the summed value is selected as the result (block 312). Alternatively, in response to identifying that the summed value written as the intermediary result to entry 204 is larger than (e.g., greater than) the value at portion 216 (e.g., a "No" decision at block 310), the value stored at the third storage location is selected as the result (block 314).

The result selected in either block 312 or block 314 is then output to a fourth storage location (block 316). For instance, the summed value written as the intermediary result to entry 204 is maintained if operation of the procedure 300 proceeds to block 312. Alternatively, the value of portion 216 is written to entry 204 (e.g., overwriting the summed value written as the intermediary result to entry 204) if operation of the procedure 300 proceeds to block 314.

Figure 4:
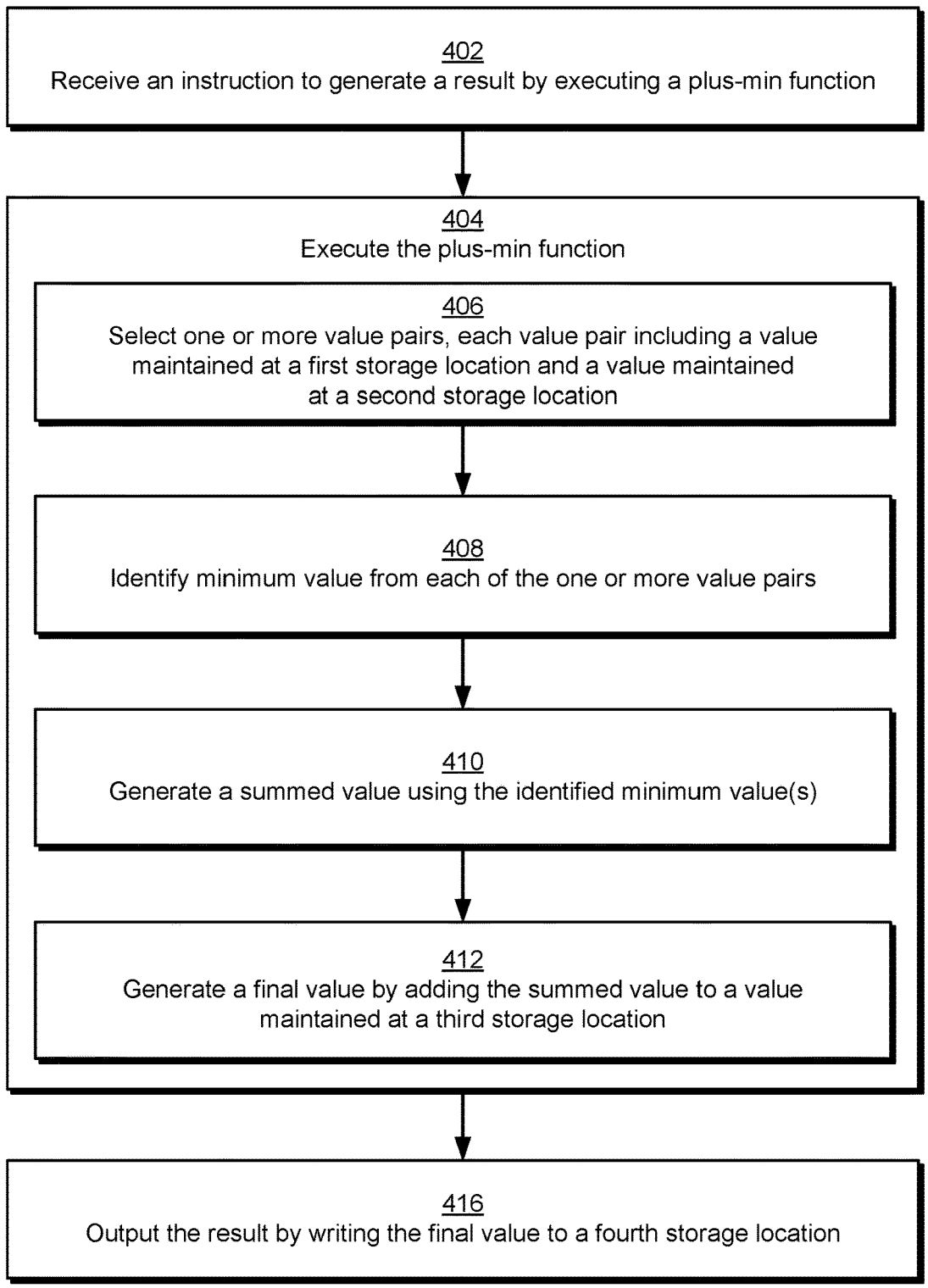
FIG. 4 depicts a procedure in an example implementation of a processor generating a result by executing a matrix plus-min function.

FIG. 4 depicts a procedure 400 in an example implementation of generating a result by executing a plus-min function in accordance with the techniques described herein.

To begin, an instruction to generate a result by executing a plus-min function is received (block 402). The core 104, for instance, receives a MFMA instruction 114 that causes one or more logic units 106 of the core 104 to execute a plus-min function 118 as part of performing a computational task.

The plus-min function is executed in response to receiving the instruction (block 404). As part of executing the plus-min function, one or more value pairs are selected, where each value pair includes a value maintained at a first storage location and a value maintained at a second storage location (block 406). The logic unit 106, for instance, selects one or more value pairs as defined by the MFMA instruction 114, where each value pair includes one value included in portion 212 and one value included in portion 214. In implementations, each value of a value pair is associated with a common index value k.

As further part of executing the plus-min function, a minimum value is identified from each of the one or more value pairs (block 408). The logic unit 106, for instance, identifies a minimum value sharing a common index value k, for each of k entries in the portion 212 and the portion 214.

A summed value is then generated using the identified minimum value(s) (block 410). The logic unit 106, for instance, sums together the minimum value from each value pair obtained from k entries in the portion 212 and the portion 214. The summed value is then written as an intermediary result to entry 204 of matrix 202.

A final value is then generated by adding a value maintained at a third storage location to the summed value (block 412). The logic unit 106, for instance, adds the value represented by portion 216 to the summed value written as the intermediary result to entry 204. A result is then output by writing the final value to a fourth storage location (block 416). The logic unit 106, for instance, outputs the final value as the result 112 by writing the final value to entry 204 (e.g., by overwriting the summed value previously written as the intermediary result to entry 204).

The example techniques described herein are merely illustrative and many variations are possible based on this disclosure. Although features and elements are described above in particular combinations, each feature or element is usable alone without the other features and elements or in various combinations with or without other features and elements.

The various functional units illustrated in the figures and/or described herein (including, where appropriate, the processor 102 having the core 104, the logic units 106, the registers 108, and the instruction cache 120, and the MFMA instruction 114 having one or more of the min-plus function 116 or the plus-min function 118) are implemented in any of a variety of different manners such as hardware circuitry, software or firmware executing on a programmable processor, or any combination of two or more of hardware, software, and firmware. The methods provided are implemented in any of a variety of devices, such as a general-purpose computer, a processor, or a processor core. Suitable processors include, by way of example, a general purpose processor, a special purpose processor, a conventional processor, a digital signal processor (DSP), a graphics processing unit (GPU), a parallel accelerated processor, a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

In one or more implementations, the methods and procedures provided herein are implemented in a computer program, software, or firmware incorporated in a non-transitory computer-readable storage medium for execution by a general-purpose computer or a processor. Examples of non-transitory computer-readable storage mediums include a read only memory (ROM), a random-access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method comprising:
   generating, by a processing device, a result by executing a min-plus function using data stored at a first storage location, data stored at a second storage location, and data stored at a third storage location, the executing min-plus function including:
   computing a plurality of summed values using respective pairs of values from the first storage location and the second storage location;
   writing at least one of the plurality of summed values to a fourth storage location; and
   outputting the result based on a comparison of the at least one summed value with a value stored at the third storage location.

2. The method of claim 1, further comprising outputting the result by:
   maintaining the summed value at the fourth storage location responsive to the summed value representing a minimum value when compared to the value stored at the third storage location; or
   overwriting the summed value at the fourth storage location with the value stored at the third storage location responsive to the value stored at the third storage location representing the minimum value when compared to the summed value.

3. The method of claim 2, wherein executing the min-plus function and outputting the result is performed by a logic unit of a core of a processor.

4. The method of claim 3, wherein the first storage location, the second storage location, the third storage location, and the fourth storage location each represent a location in one or more registers of the processor.

5. The method of claim 3, wherein the first storage location, the second storage location, the third storage location, and the fourth storage location each correspond to a different register of the processor.

6. The method of claim 3, wherein the logic unit includes a plurality of threads, wherein executing the min-plus function and outputting the result is performed by each of the plurality of threads simultaneously.

7. The method of claim 6, wherein the first storage location, the second storage location, the third storage location, and the fourth storage location are different for each of the plurality of threads.

8. The method of claim 2, wherein the fourth storage location is defined by the min-plus function.

9. The method of claim 2, wherein the first value and the second value are each associated with an index value that describes where the first value is located at the first storage location and where the second value is located at the second storage location.

10. The method of claim 1, wherein writing the summed value to the fourth storage location comprises selecting the summed value from the plurality of summed values, wherein the summed value represents a minimum value of the plurality of summed values.

11. A processing device comprising:
    a plurality of registers; and
    at least one core that includes a plurality of logic units, each of the plurality of logic units configured to:
    generate a result by executing a min-plus function using data stored at a first register of the plurality of registers, data stored at a second register of the plurality of registers, and data stored at a third register of the plurality of registers;
    the executing min-plus function including:
    computing a plurality of summed values using respective pairs of values from the first register and the second register;
    writing at least one of the plurality of summed values to a fourth register; and
    generating the result based on a comparison of the at least one summed value with a value stored at the third register.

12. The processing device of claim 11, wherein generating the result further comprises:
    maintaining at least one of plurality of summed values at the fourth register responsive to the at least one summed value representing a minimum value when compared to the value stored at the third register; or
    overwriting the at least one summed value at the fourth register with the value stored at the third register responsive to the value stored at the third register representing the minimum value when compared to the at least one summed value.

13. A system comprising:
    a processor to:
    generate a result by executing a plus-min function using data stored at a first storage location, data stored at a second storage location, and data stored at a third storage location;
    the executing the plus-min function including:
    selecting a plurality of value pairs from the first storage location and the second storage location;
    generating a summed value using minimum values from the plurality of value pairs; and
    generating the result by combining the summed value with the data stored at the third storage location.

14. The system of claim 13, the executing the plus-min function further including writing the summed value to a fourth storage location.

15. The system of claim 14, the processor further configured to output the result by overwriting the summed value at the fourth storage location with the result.

16. The system of claim 13, wherein address information for each value in the plurality of pairs of values is defined by an index value.

17. The system of claim 16, wherein selecting the plurality of value pairs comprises accessing corresponding index values at the first storage location and second storage location.

18. The system of claim 13, wherein the first storage location, the second storage location, and the third storage location each correspond to a different register of the processor.

19. The system of claim 13, wherein the processor includes a logic unit which includes a plurality of threads, wherein executing the plus-min function is performed by each of the plurality of threads simultaneously.

20. The system of claim 19, wherein the first storage location, the second storage location, the third storage location are different for each of the plurality of threads.

* * * * *